Aug. 2, 1960   S. R. RICH   2,947,889
ELECTROMECHANICAL TRANSDUCER SYSTEM
Filed Aug. 27, 1956   2 Sheets—Sheet 1
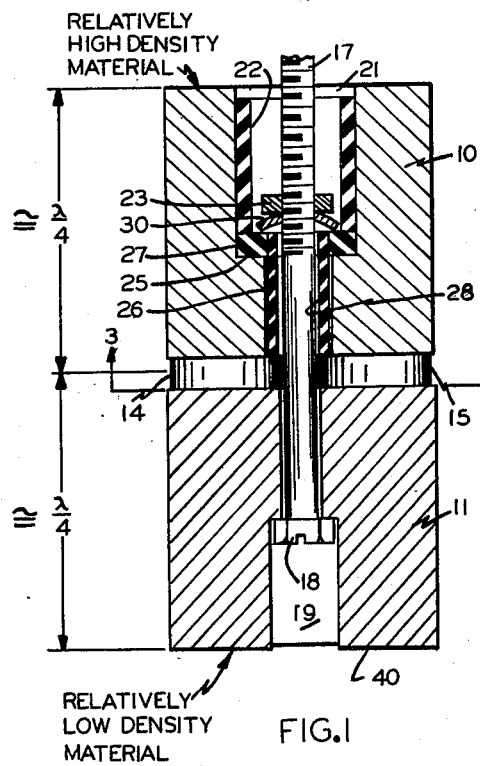
FIG.1
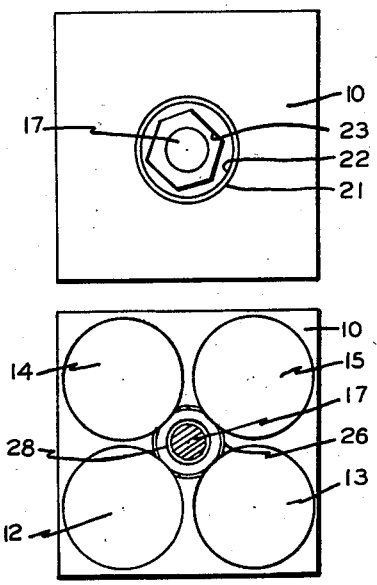
FIG.2
FIG.3
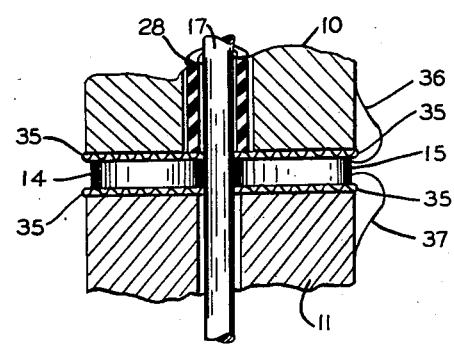
FIG.4
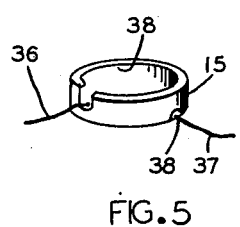
FIG.5
INVENTOR.
STANLEY R. RICH

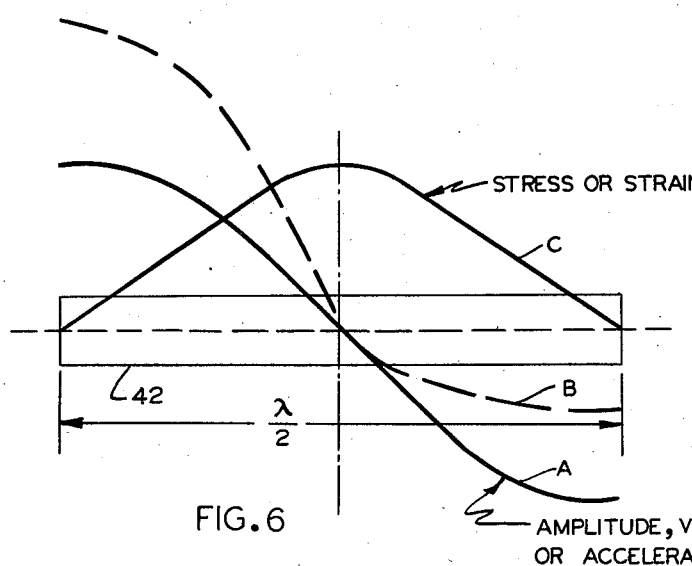
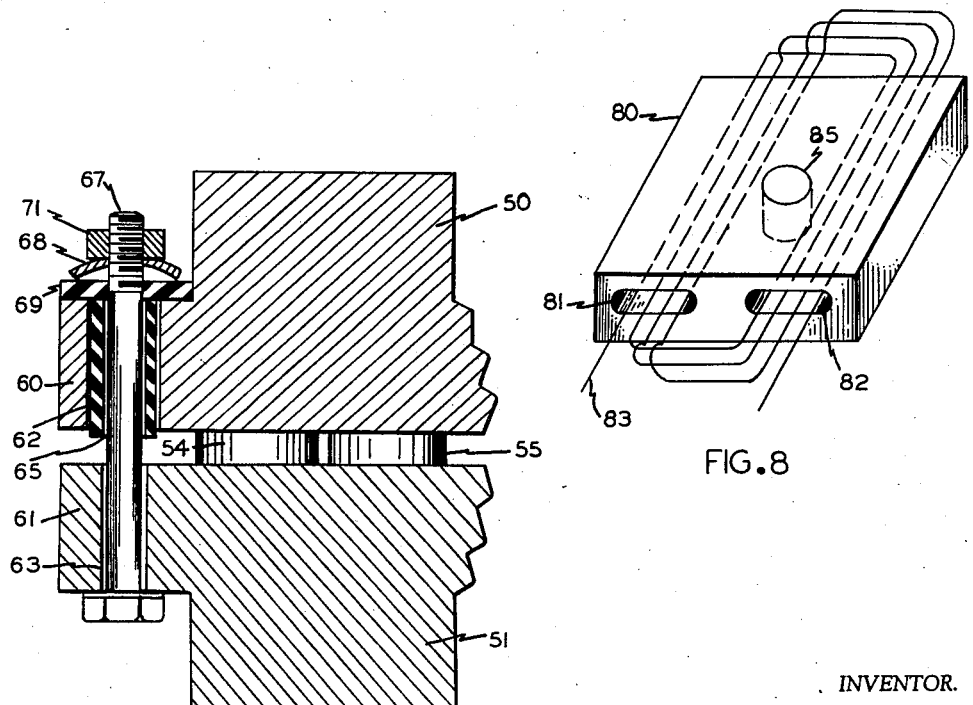

United States Patent Office 2,947,889
Patented Aug. 2, 1960

2,947,889

ELECTROMECHANICAL TRANSDUCER SYSTEM

Stanley R. Rich, West Hartford, Conn., assignor to The General Ultrasonics Company, a corporation of Connecticut Filed Aug. 27, 1956, Ser. No. 606,478

16 Claims. (Cl. 310—26)

This invention relates to electromechanical transducers, and more particularly to systems employing such transducers to interchange large quantities of energy with low losses.

Uses of elastic wave energy in industry are being made and innovated at an increasing pace. However in some areas, such as processes employing liquid baths which it is desired to irradiate with compressional wave (sonic or ultrasonic) energy, progress into large scale use of such energy awaits the availability of an electromechanical transducer at reasonable cost which will convert large amounts of electrical energy into compressional wave energy, with small and insignificant heat loss. Known transducers generally lack the ability to handle large power, except perhaps as pulse peaks, without soon generating destructive heat. Efficiencies below 50% are common, and efficiencies as much as 65% are considered high. Further, the permissible stresses and strains that can be endured by the electromechanical transducer materials are so low that these materials are soon destroyed by the amount of power which can be usefully employed in such processes. Attempts to solve this problem by employing more transducers often carries the cost of an installation beyond economically acceptable limits.

It is an object of the present invention to provide an electromechanical transducer system which is capable of interchanging large amounts of electrical and elastic wave energy with high efficiency. It is another object of the invention to provide such a system having a relatively low Q so that it can be used with electric energy sources which do not have reliable frequency regulation, such as a motor generator driven by an induction motor. It is a further object of the invention to provide such a system which can operate continuously without generating destructive heat in any of its parts. These and other desirable objects are attained, according to this invention, by a sandwich transducer structure in which a thin electromechanical transducer is held between two pieces of solid materials having relatively dissimilar densities, for example aluminum and brass, or aluminum and steel. According to another important feature of the invention, this structure is held together, by suitable clamping means, with a force sufficient to apply a static compressive stress of a magnitude which may be chosen to be greater than and in opposition to any instantaneous negative stress produced in the system during vibration at practically any energy level. These features of the invention are described in greater detail in the following description of certain embodiments. This description refers to the accompanying drawings, in which:

Fig. 1 is a vertical section through a transducer system built according to the invention;

Fig. 2 is a top view of Fig. 1;

Fig. 3 is a section along line 3—3 in Fig. 1;

Fig. 4 is a fragmentary vertical section showing a modification of Fig. 1;

Fig. 5 illustrates in detail an electromechanical transducer element suitable for use in systems built according to the invention;

Fig. 6 is a graph to aid the description;

Fig. 7 is a vertical section, partly broken away through another embodiment of the invention; and Fig. 8 illustrates another electromechanical transducer element suitable for use in systems built according to the invention.

In Fig. 1 a block of steel or other suitable metal of corresponding properties 10 and a block of aluminum or other suitable light metal 11 have four electromechanical transducer elements, 12, 13, 14 and 15 as shown in Fig. 3, sandwiched between them. These may be made of any piezoelectric or electrostrictive material, for example quartz, or barium titanate. This sandwich is held together by a bolt 17 passing through bores in the blocks 10 and 11. The head 18 of the bolt 17 rests on a shoulder provided by enlarging the outer portion 19 of the bore in the aluminum block 11. The outer portion 21 of the bore in the steel block 10 is enlarged to receive an electrically insulating sleeve 22 and the nut 23 of the bolt 17. A shoulder 25 is provided at the junction of the outer portion 21 and the inner portion 26 of the bore in the steel block 10, and an electrically insulating washer 27 rests on this shoulder. A second electrically insulating sleeve 28 lines the inner bore portion 26. A convex shaped hard metal washer 30 rests on the washer 27, and the nut 23 is used to compress this washer to apply a static compressive stress to the system. The magnitude of this stress, and its purpose are described below.

Referring to Fig. 4, the elements corresponding to elements shown in Fig. 1 bear the same reference numbers. The transducer elements (only elements 14 and 15 are shown) in this embodiment are affixed to the blocks 10 and 11 by a suitable cement 35. An epoxy cement is suitable. Each transducer element is fitted with electric conductors, one for each face. The conductors 36 and 37 for element 15 only are shown, and these are connected one to each of blocks 10 and 11. As indicated in Fig. 5, each transducer element is provided with an electrode 38 on each face; each electrode has a tab to which one of the wires 36 or 37 is attached. While in Fig. 1, the blocks 10 and 11 themselves make electrical contact with the transducer elements, which are usually fitted with electrodes like electrode 38, these elements can if desired be fitted with conductors like conductors 36 and 37, and the conductors can be bonded to the blocks as shown in Fig. 4, to insure direct electrical contact to the electrodes in all events. On the other hand, the conductors 36 and 37 may be omitted entirely from the embodiment shown in Fig. 4. I have built such systems, in which the static compressive stress was applied while the cement 35 was soft, and they have operated successfully.

The "sandwich" technique of transducer system construction was apparently invented by Langevin—see Figure 3 of British patent specification 145,691, for example. In the Langevin system, two steel or stainless steel blocks of equal thickness are placed one on each side of a mosaic of quartz crystals. The system resonates as a half-wave vibrator with the quartz (which is comparatively thin) located essentially at a node. The overall Q of this device is extremely high, being basically the ratio between the acoustic impedance of steel and the acoustic impedance of the liquid in which it is used. This Q is of the order of 30. That is, the frequency span of operation is $\frac{1}{30}$ of the resonant frequency. At 20 kc./sec., the Langevin transducer must be operated at plus or minus 330 cycles per second in most liquids. This has too high a Q for industrial purposes.

In the present invention, a low density (light) metal is used for one side of the sandwich, and a high density (heavy) metal is used for the other side. Energy is radiated from the surface of the light metal. One effect of this new structure is a reduction in Q, due to the fact that the acoustic impedances of light metals (aluminum or magnesium) are of the order of 1/3 to 1/7 that of steel, to values of Q of the order of 10. Conservation of momentum considerations still further reduce the Q of the overall system by virtue of the fact that the surface of the light metal must move with a particle displacement of many times the particle displacement at the surface of the heavy metal. The ratio is the ratio of the densities in the two metals, if the velocity of sound is the same in both. The reason for this is that the velocity of sound determines the resonant frequency of the sandwich while the particle velocity is determined by the fact that the momentum of the two sides must be the same, to satisfy the requirements of the law of conservation of momentum. This dictates that the particle velocities at the end surfaces of the two blocks 10 and 11, for example, must be in inverse ratio to the densities of the two materials of the blocks, in order that the density of one metal times the particle velocity at its surface may be equal to the density of the other metal times the particle velocity at its surface. In sandwich combinations of steel or brass for example as the heavy metal with aluminum or one of its alloys as the light metal, a particle displacement or velocity amplification of about 3.33 is obtained, and when magnesium or one of its alloys is substituted for aluminum or its alloys the particle velocity or displacement amplification is about 5.6. The Q is thus further lowered because energy radiated from the surface of the lower density metal is greater per unit energy stored in the resonant structure.

Referring to Fig. 6, which illustrates schematically a half-wave longitudinal vibrator 42, curve A indicates the amplitude, velocity or acceleration conditions at various particle positions in the vibrator if it is constructed according to Langevin namely, a sandwich with both free ends made of solid materials having substantially the same density. These conditions are maximum and equal and opposite at the ends, passing through zero at the node, in the center. Curve B illustrates the particle conditions provided by the present invention, that is, when the system is constructed as a sandwich in which the outer solid materials have relatively different densities, or acoustic impedances. Assuming the left-hand end to be that of the lower density metal, the maximum amplitude, velocity or acceleration of a particle at the left-hand end of the vibrator 42 is greater than at the right-hand end, and greater for the same input energy than in the prior art structures.

Momentum considerations in the present case cause the lighter metal, which is used as the radiating surface, to have greater particle velocity than the heavy metal, as shown in Fig. 6. This means that greater energy is available for radiation because radiated energy is proportional to the square of particle velocity. Consequently the present invention, as distinguished from the prior art devices which distribute available energy equally to both halves of the sandwich, provides a far greater proportion of the total energy to the radiating (and lighter) part than to the non-radiating (heavier) side.

The radiated energy can be made to leave the transducer system (at the bottom surface 40 in Fig. 1, for example) in a plane-wave form. This is often desirable because it can avoid undesirable focusing effects in treatment baths, and thereby permit accurately controlled irradiation of such baths with arrays of transducer systems. As an example of dimensions suitable for this purpose, one embodiment of a half-wave 20 kc./sec. vibrator uses steel and aluminum alloy cubes 2" x 2" x 2", with barium titanate 1/4" thick between them. These dimensions of the cubes all approximate to one quarter wave length of elastic waves in the material. If brass or other copper-bearing metal is used in place of the steel, its dimensions may be 2" x 2" x 1½", since brass and other copper-bearing metals have a lower velocity of sound than aluminum and 1½" depth is equivalent approximately to 2" in aluminum. The aluminum alloys used are alloys containing at least 70% aluminum.

While sandwich structures held together solely by cement will work and give all the amplification effects described above, consideration of curve C in Fig. 6 will show that the stress or strain in a half-wave vibrator is maximum at the node. If the cemented surfaces are so located in the structure, whether it be one-half wave long or longer, the strength of the cement bond limits the power that can be developed by the system.

When power is increased, eventually an instantaneous negative stress will be reached which will be capable of weakening or rupturing the bond. The bolt 17 and nut 23 are preferably tightened on the washer 30 to exert a static positive compressive stress which is greater in magnitude than any instantaneous negative stress possible at desired power levels of operation. This makes it possible greatly to extend both the power range and the useful life of sandwich transducer systems. The bonding material is prevented from going through the type of mechanical hysteresis loop that occurs in non-engineering materials, which results in internal losses and eventual failure. As shown in Fig. 1, the bonding material may be omitted entirely, when compressive stress is provided, if all meeting surfaces are accurately flat. I have built such transducer systems, and operated them successfully.

The efficiency of transducer systems according to the invention is very high, exceeding 90%, when barium titanate is used, for example. Ordinarily barium titanates, and certain ferrites, have efficiencies around 65% when operated in a conventional thickness mode. The losses are mainly mechanical (in barium titanate the electrical losses are less than 4%, as a capacitor). However, in the present invention, the transducer material (e.g. barium titanate) is only a small fraction of the vibrating system. For example, in a 20 kc./sec. system, it may be only 1/4" out of 4", or 6.3% of the structure. Relatively lossless metals or other materials then make up 94% of the total. The generated heat, or losses, are quite small. Also, whatever heat is generated in the transducer elements is easily given up to the metal masses because the elements are thin, and is easily carried away by the metal masses.

An alternative transducer system is shown in Fig. 7, in which a clamping means for applying static compressive stress to the system is located outside the system. Blocks 50 and 51, corresponding respectively to blocks 10 and 11 in Fig. 1, hold between them transducer elements 54 and 55 corresponding respectively to elements 14 and 15 in Fig. 1. Flanges 60 and 61 are provided on the left-hand side of each block, 50 and 51 respectively, and similar flanges (not shown) are provided on the opposite side of each block. Each set of confronting flanges is provided with bores, 62 and 63, and the bore 62 in flange 60 is fitted with an electrically insulating sleeve 65. A bolt 67 is fitted in the bores and through the sleeve 65, and a curved metal washer 68, resting on an electrically insulating washer 69, is compressed by a nut 71 to apply the static compressive stress. It will be appreciated that at least two sets of flanges and bolts are needed to apply this force, although to distribute it as evenly as possible more may be desired in a particular case. Obviously, cement can be included according to Fig. 4, if desired.

Fig. 8 illustrates the structure of a magnetostrictive transducer element which can be substituted in Fig. 1, Fig. 4 or Fig. 7, for the elements shown in Fig. 3. A block 80 of magnetostrictive material is provided with two bores 81 and 82 parallel to a pair of opposite side edges. A wire 83 is coiled through these bores in a fashion to excite the block into magnetostrictive vibration in the thickness dimension, when furnished with suitable electric current in a well known manner. A hole 85 is provided in the center of the block, in the thickness direction, for passage of the bolt 17 if a structure like that of Fig. 1 is used. The block 80 can be made of laminated sheets, or can be solid, as shown. It can be a ferrite. When magnetostrictive transducer elements are used, the electrically insulating sleeves and washers, shown in Fig. 1 and Fig. 7, may be omitted.

The embodiments illustrated and described herein are illustrations only of the invention, and other embodiments will occur to those skilled in the art. No attempt has been made herein to go into all possible embodiments, but rather only to illustrate the principles of the invention and the best manner now known to practice it.

What I claim is:

1. An electromechanical transducer system comprising electromechanical transducer means sandwiched between two pieces of solid materials which have relatively dissimilar densities and constituting with said pieces a mechanical vibrator, said system being dimensioned to vibrate as a half-wave vibrator in the direction of a line through said pieces and said transducer means.

2. An electromechanical transducer system comprising electromechanical transducer means sandwiched between two pieces of solid materials which have relatively dissimilar densities and constituting with said pieces a mechanical vibrator, said vibrator being dimensioned to vibrate substantially as a longitudinally resonant vibrator in the direction of a line through said pieces and said transducer means, each of said pieces being dimensioned to constitute substantially one or more quarter-wave sections of said transducer system.

3. A system according to claim 2 in which each of said pieces is less than one-half wave length long in any direction transverse to said line at the vibrating frequency of the system.

4. An electromechanical transducer system comprising electromechanical transducer means sandwiched between two substantially cube shaped pieces of solid materials which have relatively dissimilar densities and constituting with said pieces a mechanical vibrator, said pieces having length, height and width dimensions all approximating to one-quarter wave length of elastic waves therein at the vibrating frequency of the system.

5. An electromechanical transducer system comprising electromechanical transducer means sandwiched between a piece of metal containing at least 70% aluminum and a piece of copper-bearing metal.

6. An electromechanical transducer system comprising electromechanical transducer means sandwiched between a piece of metal containing at least 70% aluminum and a piece of ferrous metal.

7. An electromechanical transducer system comprising electromechanical transducer means sandwiched between a substantially cube shaped piece of metal containing at least 70% aluminum and a substantially cube shaped piece of ferrous metal.

8. An electromechanical transducer system comprising electromechanical transducer means sandwiched between a piece of metal containing a substantial proportion of magnesium and a piece of copper-bearing metal.

9. An electromechanical transducer system comprising electromechanical transducer means sandwiched between a piece of metal containing a substantial proportion of magnesium and a piece of ferrous metal.

10. An electromechanical transducer system comprising electromechanical transducer means sandwiched between a substantially cube shaped piece of metal containing a substantial proportion of magnesium, and a substantially cube shaped piece of ferrous metal.

11. An electromechanical transducer system comprising piezoelectric material sandwiched between a piece of metal containing at least 70% aluminum and a piece of ferrous metal.

12. An electromechanical transducer system comprising electrostrictive material sandwiched between a piece of metal containing at least 70% aluminum and a piece of ferrous metal.

13. An electromechanical transducer system comprising magnetostrictive material sandwiched between a piece of metal containing at least 70% aluminum and a piece of ferrous metal.

14. An electromechanical transducer system comprising piezoelectric material sandwiched between a piece of metal containing a substantial proportion of magnesium and a piece of comparatively higher density metal and constituting with said pieces a mechanical vibrator.

15. An electromechanical transducer system comprising electrostrictive material sandwiched between a piece of metal containing a substantial proportion of magnesium and a piece of comparatively higher density metal and constituting with said pieces a mechanical vibrator.

16. An electromechanical transducer system comprising magnetostrictive material sandwiched between a piece of metal containing a substantial proportion of magnesium and a piece of comparatively higher density metal and constituting with said pieces a mechanical vibrator.

References Cited in the file of this patent

UNITED STATES PATENTS

| | | |
|---|---|---|
| Re.19,063 | Neuland | Jan. 23, 1934 |
| 1,751,359 | Ruben | Mar. 18, 1930 |
| 1,872,304 | Kraut et al. | Aug. 16, 1932 |
| 2,435,031 | Burns | Jan. 27, 1948 |
| 2,454,264 | Stigter | Nov. 16, 1948 |
| 2,534,276 | Lancor | Dec. 19, 1950 |
| 2,704,333 | Calosi et al. | Mar. 15, 1955 |
| 2,714,672 | Wright et al. | Aug. 2, 1955 |

FOREIGN PATENTS

| | | |
|---|---|---|
| 145,691 | Great Britain | July 28, 1921 |

Notice of Adverse Decision in Interference

In Interference No. 91,802 involving Patent No. 2,947,889, S. R. Rich, Electromechanical transducer system, final judgment adverse to the patentee was rendered Sept. 18, 1962, as to claim 1.
[*Official Gazette October 16, 1962.*]